United States Patent Office 2,777,778
Patented Jan. 15, 1957

2,777,778
PROCESS FOR PREPARING CADMIUM RED PIGMENT

Benjamin W. Allan and Frank O. Rummery, Baltimore, Md., assignors to The Glidden Company, Cleveland, Ohio, a corporation of Ohio No Drawing. Application July 19, 1952, Serial No. 299,920

8 Claims. (Cl. 106—301)

This invention relates to a novel process for preparing pure or extended cadmium red pigment from pure or extended cadmium yellow greencake, respectively.

Pure cadmium red pigments are composed of cadmium, sulfur and selenium in chemical combination in proportions which may be varied over rather wide ranges to yield different shades of orange and red. Pure cadmium yellow pigments are composed only of cadmium and sulfur, but when very small amounts of selenium are introduced thereinto, the color deepens to red, then to maroon, and ultimately to very deep maroons. The extended cadmium red pigments are analogous to the pure reds in the foregoing respects, the difference being that the extended reds include barium sulrate as extender. In the past the selenium which has been introduced into a pure or extended cadmium sulfide precipitate has been in the elemental state, either as very finely ground selenium intimately mixed into the cadmium sulfide, or as elemental selenium coprecipitated with the cadmium sulfide from a solution of an alkali metal sulfide or alkali-earth metal sulfide. We have now found, however, that it is unnecessary to employ only elemental selenium, and that oxidic and other compounds of selenium may be reacted instead to advantage. Selenium dioxide is one such compound which may be used, and others are named hereinafter.

Accordingly, it is an object of this invention to prepare pure or extended cadmium red pigments by reacting oxidic selenium compounds with pure and/or extended uncalcined cadmium sulfide with or without reducing compounds and/or elemental selenium.

Another object is to introduce selenium into pure or extended cadmium sulfide greencake by supplying at least a substantial part to as much as all of the selenium in the form of an oxidic selenium compound.

These and other objects will be apparent from the following description of the invention.

We have found that selenium oxides and various other selenium compounds may be employed advantageously in the preparation of cadmium red pigment by introducing one or more of such compounds directly into pure or extended uncalcined cadmium sulfide precipitate. Thus, a cadmium sulfide precipitate may be prepared in known manners without any selenium compound being present during the strike, and then the desired amount of selenium oxide may be stirred into the precipitate (preferably after the latter has been filtered and washed), together with added water if necessary, until the selenium oxide has all been dissolved and has been uniformly disseminated through the precipitate. The whole mass may then be dried and calcined. Selenium oxides and/or other selenium compounds may also be mixed in a dry state with dry cadmium sulfide greencake until a substantially uniform mixture has been secured, after which the dry mixture may be calcined.

In the course of our efforts to use selenium oxides directly in preparing cadmium red pigments from cadmium yellow greencakes, we found that selenium oxides by themselves can provide too much oxygen for efficient incorporation of the selenium, and that reducing ingredients are desirably incorporated in the mass at any time prior to calcination to consume the excess oxygen. Sulfur is very effective for this purpose since it combines with the oxygen during calcination to form sulfur dioxide. The general reaction may be represented as follows:

$$xCdS + CdS + 2SeO_2 + S \rightarrow xCdS \cdot Se \cdot CdSe + 2SO_2$$

It will be noted that according to this equation the added sulfur is proportioned so as to form $SO_2$ with half of the oxygen introduced in the form of selenium dioxide, the remaining oxygen thereof ultimately forming $SO_2$ by combining with sulfur of the cadmium sulfide precipitate. Such proportions have been found to be very effective for all shades of red, although we have also found that in some instances the sulfur need only be proportioned to react with 30–40% or less of the oxygen of the selenium dioxide, i. e., 60%–80% of all oxygen in excess of one atom of oxygen per atom of selenium. While the selenium is effectively combined when such smaller proportions of sulfur are used, the amount of soluble cadmium found in the calcined pigment generally tends to increase as the proportion of sulfur is reduced below the amount corresponding to about 40% of the oxygen content of the $SeO_2$. Accordingly, to prevent such loss of cadmium, we prefer to use amounts of sulfur corresponding to at least 40% of the oxygen content of the $SeO_2$, and we especially prefer to consume 50% or thereabout, i. e., substantially all of the oxygen in excess of one atom thereof per atom of selenium.

Other reagents may be employed similarly in place of sulfur; for example, SeS or $SeS_2$. Elemental selenium may also be employed along with $SeO_2$ in equal molar proportions, since such proportions provide only one atom of oxygen per atom of selenium present. Likewise combinations of elemental selenium and selenium trioxide may be used similarly.

If oxidic compounds of selenium other than selenium oxide(s) are used, such as selenium sulfite ($SeSO_3$), or the selenyl halides ($SeOCl_2$, $SeOBr_2$, $SeOF_2$ or $SeOI_2$), the amount of sulfur or other reagent functioning to combine with excess oxygen can be reduced materially and in some instances eliminated completely, since added sulfur is only needed when the oxidic selenium compound contains more oxygen than one atom of oxygen per atom of contained selenium plus two atoms of oxygen per atom of sulfur (if any) present in the compound. Thus no added sulfur is needed in the case of such compounds as $SeSO_3$ and the selenyl halides.

It should be understood that more sulfur or more sulfur-providing compound than is needed to combine with half of the oxygen (i. e., all of the oxygen in excess of one atom thereof per atom of selenium), of $SeO_2$ may be used, but that such excess sulfur would lighten the shade of red over the shade secured in the absence of such excess.

The usual ranges of temperature employed in prior art calcinations may be employed when practicing our invention, but we have found that in general the optimum temperatures conducive to maximum tinting strength and to maximum utilization of selenium are of narrower ranges than in prior art practices. In other words, where intervals of 50° C. might be tried in investigating calcining ranges of prior art practices, one should employ intervals of only 25° C. or even less when seeking the optimum range for our invention. The following examples will further illustrate this point.

It will be understood that promoters such as have been long used in the past are equally useful here in improving the effects of calcination. The following examples illustrate this feature through the use of diammonium hydrogen phosphate as the promoter.

It will be understood that conditioning salts such as have been long used in the past are equally useful here in improving the effects of calcination. The following examples illustrate this feature through the use of diammonium hydrogen phosphate as the conditioner.

It will also be understood that the calcination should be conducted in an essentially inert or mildly reducing atmosphere, as in the prior art, and that the hot pigment should be quenched in water to minimize oxidation of the pigment and deterioration of its color.

EXAMPLE 1

A pure cadmium yellow greencake was prepared by a simultaneous strike of a cadmium sulfate solution with a solution of sodium sulfide. The cadmium sulfate solution was prepared by dissolving electrolytic cadmium metal in a sulfuric acid-nitric acid solution, to give a solution containing 197 g. of cadmium per liter and having a pH of 5.9 and a specific gravity of 1.335 at 25° C. The sodium sulfide solution was prepared by dissolving flake sodium sulfide in water and filtering to remove insoluble impurities. The resulting solution contained 34.5 g. of sulfide ion per liter, had a specific gravity of 1.084 at 25° C. and a Baumé density of 11.3. Thirteen hundred milliliters of the above sulfate solution were struck at room temperature with 2107 milliliters of the sulfide solution by simultaneously introducing the solutions into 511 milliliters of a sodium sulfate solution having a concentration of sodium sulfate of 100 grams per liter. The precipitation pH was maintained in the range 8.2–8.5, and the final pH was 8.5. The precipitate was filtered and washed to remove the soluble salts, and was then dried.

A dry mixture of yellow greencake as prepared above and selenium dioxide was ground in a mortar and calcined. Upon examination of the calcined product, is was apparent that a thorough dispersion of selenium dioxide was not readily obtainable in this way. There were dark specks in the pigment attributable to localized high concentrations of selenium dioxide. Ball milling or other means for securing a more intimate mixture overcome this difficulty.

EXAMPLE 2

Selenium dioxide was dissolved in water to form selenious acid and the acid solution was added to dry yellow greencake of Example 1 to form a paste. The amount of selenium introduced in the form of selenious acid was such as to yield a red pigment containing approximately 17% selenium. The paste was dried and pulverized, and was then calcined at 600° C. The pigment was slightly brown and there was soluble cadmium salt in the quench water, indicating an excess of oxygen in the mixture which was calcined.

EXAMPLE 3

A portion of the yellow greencake of Example 1 was slurried in water and selenium dioxide was added in the proportions employed in Example 2. Flowers of sulfur were also added in an amount calculated to convert to sulfur dioxide half of the oxygen content of the added selenium dioxide. The slurry was thoroughly mixed, evaporated to dryness, and pulverized. The pulverized product was calcined in a closed tube at temperatures in the range 550°–600° C. and was quenched in oxygen-free water. No soluble cadmium was found in the quench water. The pigment was of good mass tone. The highest tinting strength was produced at 550° C.; tint—200; color 65% ML—35% MR; mass tone 70% ML—30% MR; the pigment was clean and bright.

EXAMPLE 4

A mixture was prepared to duplicate that of Example 3, except to include $(NH_4)_2HPO_4$ equivalent to 1% $H_3PO_4$ on the total solids. The dry mass was pulverized and calcined at 550° C. and 600° C.

600° C.:
 Tint: 220
 Color: 70% ML—30% MR; very clean and bright
 Mass Tone: 60% ML—40% MR 550° C.:
 Tint: 260
 Color: 55% MR—45% ML; clean and bright
 Mass tone: 80% MR—20% ML It will be noted that the conditioner increased the tinting strength and deepened the shade. $(NH_4)_2HPO_4$ equivalent to 1% $H_3PO_4$ on the total solids is included in each of the following examples.

EXAMPLE 5

A mixture intended to produce a light red pigment was prepared by adding an aqueous solution of selenium dioxide to a portion of the yellow greencake of Example 1 in proportions of .247 grams of selenium per gram of cadmium sulfide. The resulting mixture was dried and pulverized and then was calcined. When calcined 35 minutes at 610° C. and quenched, the quench water contained appreciable amounts of cadmium salts. The resulting pigment had a tinting strength of approximately 250, and a clean color of 50% LR—50% ML. When calcined 30 minutes at 630° C., less soluble cadmium was found in the quench water, and the pigment had a tinting strength of approximately 230 and a clean and bright color of 30% LR—70% ML.

When a mixture was made up with the same proportions of selenium dioxide but with enough sulfur to combine with half of the oxygen of the selenium dioxide, calcination at 560° C. for 36 minutes gave no soluble cadmium, a tinting strength of 300, and a color of 45% LR—55% ML. Calcination at 600° C. for 26 minutes gave no soluble cadmium, a tinting strength of 240, a clean color of 60% LR—40% ML, and a clean mass tone of 40% LR—60% ML.

EXAMPLE 6

Two pastes intended to produce medium red pigment were prepared from portions of the yellow greencake of Example 1 with added aqueous selenium dioxide solution and elemental sulfur. The selenium dioxide was proportioned to yield .445 gram of selenium per gram of cadmium sulfide. One of the pastes, identified as Paste A, contained enough sulfur to react with 37% of the oxygen of the selenium dioxide, while the other paste, paste B, contained enough sulfur to react with 50% of the oxygen. After being dried and pulverized, the respective crude pigments were each calcined at 525° C. and 550° C. The results are tabulated:

| Paste | Temp., °C. | Time | Soluble Cad. | Tinting Strength | Color | Mass Tone |
|---|---|---|---|---|---|---|
| A | 525 | 25 | None | 280–300 | Approx. MR—Brown | Approx. MR—Brown. |
| A | 550 | 21 | Very Slight | Approx. 280 | 80% MR—20% ML | 75% MR—25% D (possibly slightly brown). |
| B | 525 | 17 | None | 285 | 55% MR—45% D | 40% MR—60% D. |
| B | 550 | 21 | do | 275 | 60% MR—40% D | Clean and bright 20% MR—80% D. |

EXAMPLE 7

Various maroon pigments were made up from portions of the yellow greencake of Example 1 by adding aqueous selenium dioxide solutions and flowers of sulfur thereto, and then drying, pulverizing and calcining. The proportions employed are tabulated along with the indicated data of each test:

| Calc. Temp., °C. | Time | Soluble Cad. | Tinting Strength | Color | Mass Tone |
|---|---|---|---|---|---|
| Paste C; .444 g. SeO₂/g. CdS; 16.8% O₂ reacted with S | | | | | |
| 550 | 28 | None | Approx. 300 | Darker than maroon | Darker than maroon-brown. |
| 612 | 25 | Slight | 300 | Darker than maroon (possibly brown). | Darker than maroon (possibly brown). |
| 635 | 17 | do | Approx. 260 | Maroon (possibly brown) | Do. |
| Paste D; .444 g. SeO₂/g. CdS; 30% O₂ reacted with S | | | | | |
| 585 | 30 | None | 265 | 45% M—55% D (clean) | 60% M—40% D; clean and bright. |
| 600 | 23 | Very Slight | 250 | 55% M—45% D (cleaner than standard). | 60% M—40% D; cleaner than standard. |
| Paste E; .444 g. SeO₂/g. CdS; 35% O₂ reacted with S | | | | | |
| 585 | 32 | None | 260 | 50% M—50% D | 80% M—20% D; very slightly brown. |
| Paste F; .433 g. SeO₂/g. CdS; 41% O₂ reacted with S | | | | | |
| 595 | 35 | Very slight | 325 | Deep-Brown | 60% D—40% M; clean. |
| 610 | 30 | Slight | 320 | 20% MR —80% D; clean | 80% D—20% M; clean. |
| Paste G; .433 g. SeO₂/g. CdS; 50% O₂ reacted with S | | | | | |
| 560 | 35 | Negligible | 320 | 55% MR—45% D | 15% MR—85% D; slightly flat. |
| 580 | 32 | None | 290 | 70% MR—30% D; clean | 30% MR—70% D; clean. |
| Paste H; .467 g. SeO₂/g. CdS; 50% O₂ reacted with S | | | | | |
| 560 | 31 | Very slight | 325 | 25% M—75% D; Very slightly brown. | 80% M—20% D; equal to standard. |
| 270 | 30 | None | | | 40% M—60% D; equal to standard. |
| 580 | 30 | do | 270 | 10% M—90% D; clean | 20% M—80% D; clean. |

EXAMPLE 8

Extended cadmium red

Elemental sulfur was added to a barium sulfide solution in sufficient quantity to react with 50% of the oxygen in the SeO₂ added subsequently to the washed precipitate.

The preparation was as follows:

555 cc. of cadmium sulfate solution was placed in a beaker provided with rapid agitation. The solution analyzed:

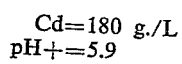

Barium sulfide solution of the following composition was prepared:

| | |
|---|---|
| Sulfide ion | 33.2 g./L |
| Ratio OH to SH | 9.995:1.00 |
| Baumé at 70° C. | 20.4 |
| Specific gravity | 1.164 |

855 cc. of the BaS solution was treated with 8.24 g. elemental sulfur and agitated to effect complete solution.

The sulfur-treated barium sulfide solution was added to the cadmium sulfate solution, thereby precipitating cadmium sulfide and finely divided sulfur. The precipitate was washed and, in paste form, was treated with 57.1 grams SeO₂ dissolved in a minimum of water. The paste was dried and calcined, yielding a clean cadmium lithopone pigment of good tinting strength in the medium to deep range.

In the foregoing examples the abbreviations ML, MR and D represent respectively "medium-light," "medium red" and "deep" in relation to the various shades of red sought. Also the numerical values of tinting strength are in percent on standard base colors.

It will be understood that in its broadest concept this invention contemplates the introduction of at least a substantial part of the desired selenium content of an intended cadmium red pigment in the form of an oxidic selenium compound. Preferably at least about half of the desired selenium content is so introduced, this being the approximate amount employed when a mixture of selenium dioxide and elemental selenium is reacted with a crude pure cadmium sulfide pigment. When an oxidic compound such as SeSO₃ or SeOCl₂ is used, all of the desired selenium can be introduced by the compound. Likewise, when SeO₂ is used with or without enough elemental sulfur to react with up to 50% of the oxygen content of the selenium dioxide, then all of the desired selenium can be derived from the SeO₂. However, if a compound such as SeS or SeS₂ is used to provide the reducing component which reacts with up to 50% of the oxygen content of the SeO₂, or if a solution of selenium in selenyl chloride is employed, then part of the desired selenium comes from an oxidic selenium compound, and the balance comes from the SeS, SeS₂ or selenyl chloride and dissolved selenium. Thus, in its broadest aspects, the invention departs from the prior art by contemplating the introduction into a pure or extended uncalcined cadmium sulfide precipitate of at least a substantial part, and as much as all, of the desired selenium in the form of an oxidic selenium compound.

In summary, it will be apparent that the present invention provides a unique and simple process for preparing cadmium red pigment, the process being eminently satisfactory in producing satisfactory pigment qualities and in utilizing the selenium efficiently. The process makes it possible to eliminate the co-precipitation practices of the prior art in which elemental selenium was dissolved in a sulfide solution, and to prepare any desired shade of pure or extended red pigment directly from a corresponding pure or extended cadmium yellow greencake. Thus, in the pigment plant, it becomes possible to precipitate only the pure or extended yellow pigment, and then to calcine those greencakes either directly to yellow pigment (where such calcination is necessary), or, after incorporating a desired amount of oxidic selenium compound with or without added sulfur or equivalent sulfur compound, calcining directly to red pigment. Hence only two precipitation procedures need be practiced, regardless of the ultimate color desired, and process control and personnel training problems are greatly reduced. Moreover, the simplified procedures yield excellent pigment as the foregoing examples illustrate.

In the following claims, the term "cadmium red pigment" is employed to mean a cadmium pigment which in addition to cadmium sulfide contains at least enough selenium to impart to said pigment a color falling at least partially in the red range of the visible spectrum, and absent from said pigment when the said selenium content thereof is omitted.

Having now described the invention, what we claim is:

1. The process for preparing cadmium red pigment which comprises: providing a finely-divided crude pigment mass composed essentially of (a) cadmium sulfide greencake, (b) selenium dioxide and (c) reducing agent selected from the group consisting of selenium, sulfur, binary selenium-sulfur compounds and mixtures thereof; said selenium dioxide being present in such quantity that the selenium thereof plus any selenium in said reducing agent together provide all of the selenium required to convert said greencake to a red pigment of desired shade, and said reducing agent being present in a total amount sufficient to form $SO_2$ with at least one-third of any oxygen of said selenium dioxide which is in excess of one atomic equivalent thereof for each atomic equivalent of the total selenium in said crude pigment mass; and calcining said crude pigment mass to effect its conversion to cadmium red pigment.

2. The process as claimed in claim 1 wherein the amount of selenium dioxide is such as to provide all of the required selenium, wherein sulfur is the reducing agent, and wherein the amount of sulfur is such as to form sulfur dioxide with between 60% and about 100% of the said excess oxygen content of said selenium dioxide.

3. The process as claimed in claim 2 wherein the amount of sulfur is such as to form sulfur dioxide with about 100% of the said excess oxygen content of the selenium dioxide.

4. The process as claimed in claim 1 wherein half of the required selenium is derived from selenium dioxide and wherein the remaining half is introduced as elemental selenium functioning as reducing agent.

5. The process for preparing cadmium red pigment which comprises: providing a finely-divided crude cadmium pigment mass in which susbtantially all of the cadmium is in the form of cadmium sulfide; uniformly mixing with said crude mass at least one oxidic selenium compound in an amount sufficient to provide a ratio of Se to CdS conducive to the shade of red desired in the pigment obtained by calcining said mixture; and calcining said mixture to effect its conversion into cadmium red pigment; said oxidic selenium compound being selected from the group consisting of the selenium oxides, the oxidic selenium acids, the selenyl halides and selenium sulfite.

6. The process for preparing cadmium red pigment which comprises: providing a finely-divided crude cadmium pigment mass composed essentially of cadmium yellow greencake, a substantial amount of selenium in the form of at least one oxidic selenium compound selected from the group consisting of the selenium oxides, the oxidic selenium acids, the selenyl halides and selenium sulfite, and at least a small amount of reducing agent selected from the group consisting of selenium, sulfur, binary selenium-sulfur compounds and mixtures thereof, said selenium in the form of oxidic selenium compound together with any selenium contained in said reducing agent being sufficient to produce all the selenium needed to provide a desired shade of red in the pigment obtained by calcining said crude mass; and calcining said crude mass to effect its conversion into cadmium red pigment.

7. The process as claimed in claim 6 wherein the amount of reducing agent is sufficient to combine with between about one-third and all of the excess oxygen contained in said oxidic selenium compound over the amount represented by one atomic equivalent thereof for each atomic equivalent of selenium present in said crude pigment mass.

8. The process as claimed in claim 7 wherein the reducing agent consists of sulfur coprecipitated with said cadmium yellow greencake.

References Cited in the file of this patent

UNITED STATES PATENTS

| 2,515,721 | Marcot | July 18, 1950 |
| 2,643,196 | Allan et al. | June 23, 1953 |

OTHER REFERENCES

Ser. No. 350,065, Loeffler (A. P. C.), published May 11, 1943.

Mellor, J. W.: "A Comprehensive Treatise on Inorganic and Theoretical Chemistry." Longmans, Green & Co., London, 1930, vol. 10, pages 862 and 873.